(12) United States Patent
Michaels

(10) Patent No.: US 7,430,461 B1
(45) Date of Patent: Sep. 30, 2008

(54) NETWORKING METHOD AND NETWORK FOR MARINE NAVIGATION DEVICES

(75) Inventor: Damon C. Michaels, Marlborough, MA (US)

(73) Assignee: Navico International Limited, St. Helier, NJ (US)

( * ) Notice: Subject to any disclaimer, the term of this patent is extended or adjusted under 35 U.S.C. 154(b) by 794 days.

(21) Appl. No.: 10/967,962

(22) Filed: Oct. 18, 2004

(51) Int. Cl.
*B63H 21/21* (2006.01)

(52) U.S. Cl. .......................................... 701/21; 340/984
(58) Field of Classification Search .................... 701/21, 701/36; 440/84, 11; 340/984
See application file for complete search history.

(56) References Cited

U.S. PATENT DOCUMENTS

| | | | | |
|---|---|---|---|---|
| 4,301,759 | A * | 11/1981 | de Vries | 114/144 E |
| 5,349,644 | A * | 9/1994 | Massey et al. | 706/10 |
| 6,595,315 | B1 | 7/2003 | Fujimoto et al. | |
| 6,628,299 | B2 | 9/2003 | Kitayama | |
| 6,768,450 | B1 | 7/2004 | Walters et al. | |
| 6,904,341 | B2 * | 6/2005 | Kish et al. | 701/21 |
| 7,099,755 | B2 * | 8/2006 | Mueller et al. | 701/21 |
| 7,142,955 | B1 * | 11/2006 | Kern et al. | 701/21 |
| 2004/0003958 | A1 | 1/2004 | Fujimoto et al. | |
| 2004/0051681 | A1 | 3/2004 | Kitayama | |
| 2004/0054460 | A1 | 3/2004 | Walters et al. | |

OTHER PUBLICATIONS

Northstar, 6000i Product Webpage, 2 pages (USA—Oct. 27, 2003).

* cited by examiner

*Primary Examiner*—Dalena Tran
(74) *Attorney, Agent, or Firm*—Alston & Bird LLP

(57) ABSTRACT

A method for networking a plurality of marine navigation devices into a network is provided, the network comprising one master marine navigation device and at least one slave marine navigation device. The method includes determining if a slave marine navigation device has recently been operatively coupled to the one master marine navigation device, determining if the slave marine navigation device is of a device type permitted to network with the one master marine navigation device, assigning an identifier to the slave marine navigation device if the device is of a device type permitted to network with the one master marine navigation device, and transmitting the identifier to at least the slave marine navigation device. The master marine navigation device may include a processor and a memory operatively coupled to the processor, the processor being programmed to carry out this networking method.

12 Claims, 4 Drawing Sheets

US 7,430,461 B1

NETWORKING METHOD AND NETWORK FOR MARINE NAVIGATION DEVICES

BACKGROUND

This patent is directed to marine navigation devices, and in particular to networking methods and networks for marine navigation devices.

SUMMARY OF THE INVENTION

In one aspect, a method for networking a plurality of marine navigation devices into a network is provided, the network comprising one master marine navigation device and at least one slave marine navigation device. The method includes determining if a slave marine navigation device has recently been operatively coupled to the one master marine navigation device, determining if the slave marine navigation device is of a device type permitted to network with the one master marine navigation device, assigning an identifier to the slave marine navigation device if the device is of a device type permitted to network with the one master marine navigation device, and transmitting the identifier to at least the slave marine navigation device.

In another aspect, a network of marine navigation devices includes at least one slave marine navigation device, and one master marine navigation device, the master marine navigation device including a processor and a memory operatively coupled to the processor. The processor is programmed to determine if a slave marine navigation device has recently been operatively coupled to the one master marine navigation device, to determine if the slave marine navigation device is of a device type permitted to network with the one master marine navigation device, to assign an identifier to the slave marine navigation device if the device is of a device type permitted to network with the one master marine navigation device, and to transmit the identifier to at least the slave marine navigation device.

Additional aspects of the disclosure are defined by the claims of this patent.

DETAILED DESCRIPTION OF VARIOUS EMBODIMENTS

Although the following text sets forth a detailed description of numerous different embodiments of the invention, it should be understood that the legal scope of the invention is defined by the words of the claims set forth at the end of this patent. The detailed description is to be construed as exemplary only and does not describe every possible embodiment of the invention since describing every possible embodiment would be impractical, if not impossible. Numerous alternative embodiments could be implemented, using either current technology or technology developed after the filing date of this patent, which would still fall within the scope of the claims defining the invention.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. §112, sixth paragraph.

Figure 1:
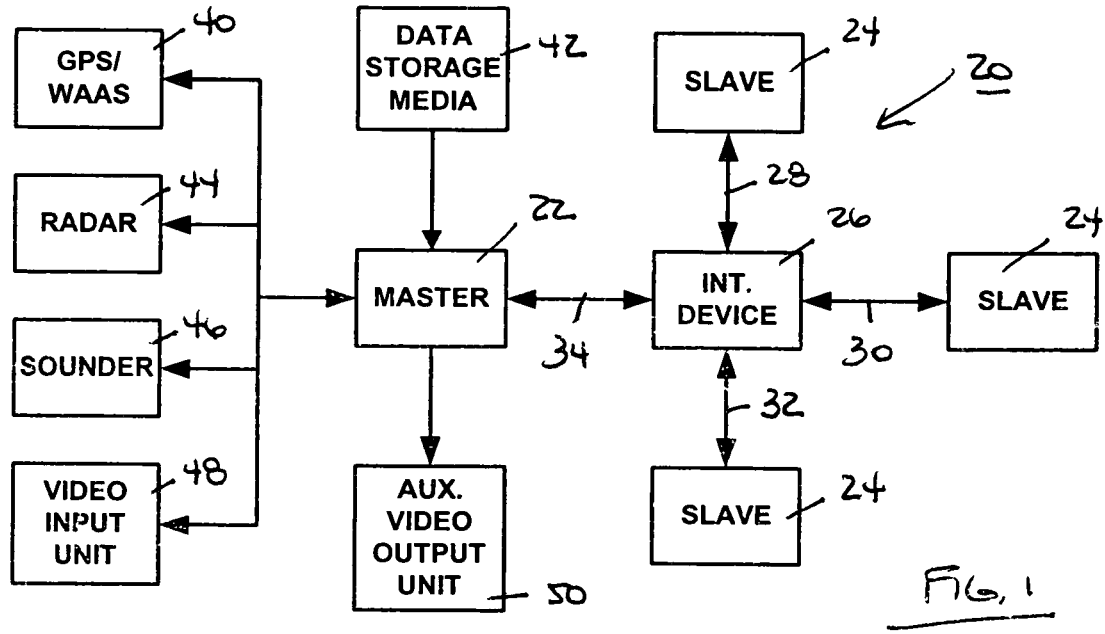
FIG. 1 is a block diagram of an embodiment of a network of marine navigation devices.

FIG. 1 illustrates an embodiment of a network 20 of marine navigation devices 22, 24. According to this embodiment of the network 20, all of the marine navigation devices 22, 24 may be structurally similar, although the present disclosure embraces networks wherein at least some of the marine navigation devices 22, 24 may be structurally different from each other. The marine navigation devices 22, 24 may be Northstar 6000i units manufactured by Brunswick New Technologies-Marine Electronics of Acton, Mass. According to this embodiment, at least one of the marine navigation devices 22 may be operationally different than the other marine navigation devices 24. In particular, the marine navigation device 22 may operate as a master device, while the marine navigation devices 24 may operate as slave devices.

As is shown in FIG. 1, the master device 22 and the slave devices 24 may be operatively coupled through the use of an intermediate device 26. Links 28, 30, 32, 34 may be defined between the master and slave marine navigation devices 22, 24 and the intermediate device 26. These links 28, 30, 32, 34 may be defined through the use of cables or wires, or the links may be defined in another fashion, such as through the use of radio frequency transceivers, infrared transceivers, etc.

According to the present embodiment, the intermediate device 26 may be a switch or switching device. Where the network 20 operates according to the IEEE 802.3u 100Base-Tx Ethernet standard, the intermediate device 26 may be an Ethernet switch or switching device. According to other embodiments, however, the intermediate device may be a bridge or repeater.

Figure 2:
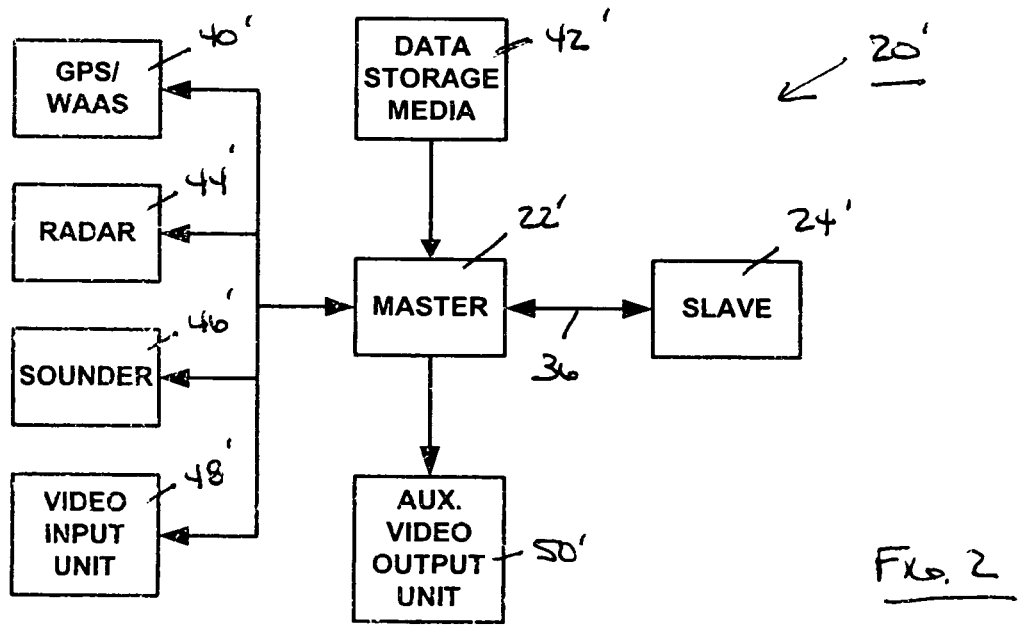
FIG. 2 is a block diagram of another embodiment of a network of marine navigation devices.

In still other embodiments, the intermediate device 26 may be removed altogether. Such an alternative embodiment is shown in FIG. 2, with elements shared in common with the embodiment of FIG. 1 given similar numbering, but differentiated with a prime. The network 20' may include one master device 22' and one slave device 24'. A link 36 may be defined between the master device 22' and the slave device 24' without the use of an intermediate device 26. The link 36 may be defined by a cable (e.g., an Ethernet crossover cable) or wire, although other links, such as wireless radio frequency or infrared links, may be used.

Returning to FIG. 1, the master marine navigation device 22 is typically operatively coupled to a GPS (Global Positioning System) antenna assembly 40, which assembly 40 may be used with the WAAS (Wide Area Augmentation System), where available. The antenna assembly 40 may be coupled to the marine navigation device 22 through the use of a cable, for example. The master device 22 is also typically configured to receive data storage media 42, which media 42 may store data that may be used in the operation of a navigation device, such as navigational charts. For instance, the master device 22 may include a drive that may accept data storage media in the form of flash memory cards.

In addition to the GPS antenna assembly 40, the master device 22 may be coupled to a plurality of other optional devices. For example, the master device 22 may be operatively coupled to a radar assembly 44, such as the Northstar radar assembly manufactured by Brunswick New Technologies-Marine Electronics of Acton, Mass. Additionally, the master device 22 may be operatively coupled to a sounder assembly 46, such as the Northstar 490 echo sounder, also manufactured by Brunswick New Technologies-Marine Electronics of Acton, Mass. Further, the master device 22 may be coupled to a video input unit or source 48, such as a video camera, TV, DVD player, VCR, etc. In fact, any manner of NTSC- or PAL-compatible device may be coupled to the master device 22, according to the configuration of the device 22.

Each of these optional devices 44, 46, 48 may be coupled to master device 22 directly, through the use of a cable, for example, or may be coupled to an intermediate device (not shown) which is then coupled to the master device 22. By coupling the devices 44, 46, 48 to the master device 22, the information gathered by these devices 44, 46, 48 and processed by the master device 22 may be accessible to all of the slave devices 22 as well. In fact, the devices 44, 46 may be operatively coupled to one of the slave devices 24 instead of the master device 22, and the information gathered by these devices and processed by the respective slave device 24 may still be accessible by the other slave devices 24 through the network 20, as will be explained in greater detail below. Depending on the bandwidth of the network 20, the information provided by the video input device 48 may also be shared among the marine navigation devices 22, 24. As a further alternative, a device, such as the radar assembly 44, may be accessible by the network 20 separate from one of the slave devices 24. Thus, the illustration of the devices 44, 46, 48 operatively coupled to the master 22 in FIGS. 1 and 2 is only one possible arrangement of the devices 44, 46, 48 according to the present disclosure.

In addition to the optional devices 44, 46, 48, the master device 22 or one or more of the slave devices 24 may be operatively coupled to an auxiliary video display unit 50. That is to say, the marine navigation devices 22, 24 typically include a video display unit, for example an LCD (Liquid Crystal Display), as explained below. However, the user may prefer a larger picture than is possible through the use of the integrated video display unit. Accordingly, the auxiliary video display unit 50 may be operatively coupled to the device 22, 24. The auxiliary video display unit 50 may be a VGA display unit, for example a Northstar 1201 or 1202 remote display manufactured by Brunswick New Technologies-Marine Electronics of Acton, Mass.

Figure 3:
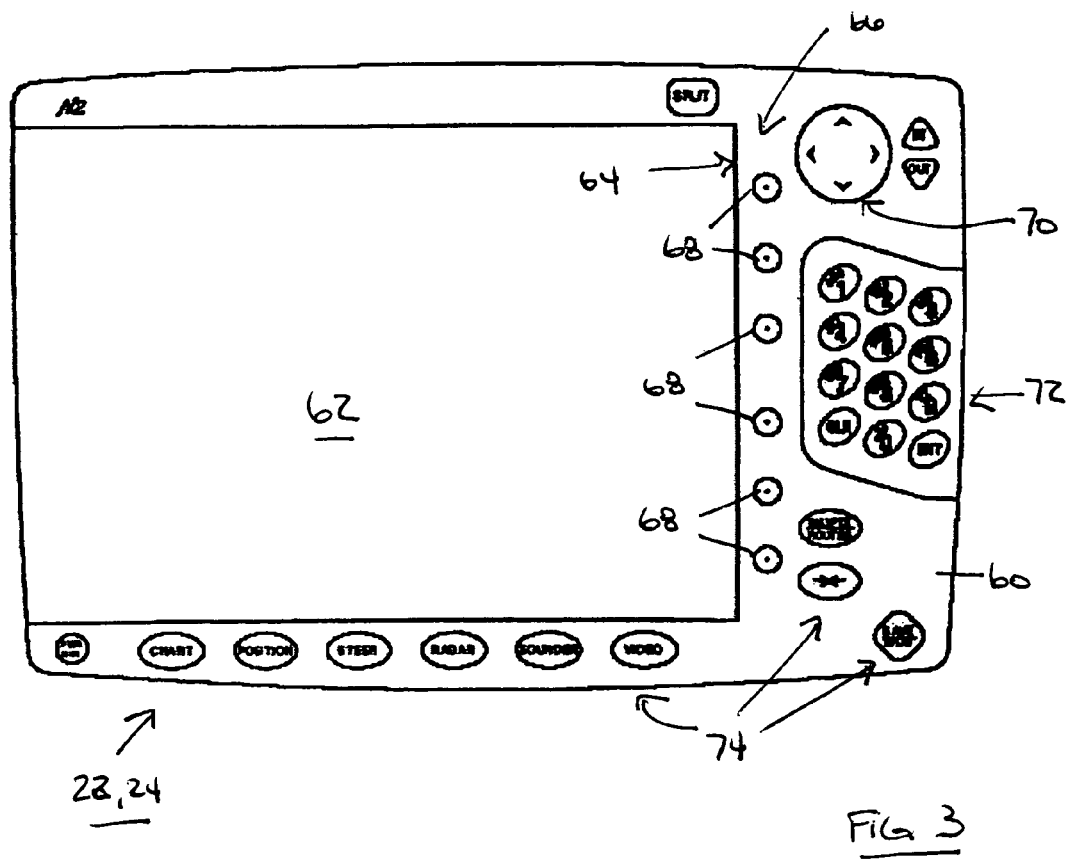
FIG. 3 is a front view of an embodiment of one of the marine navigation devices shown in FIGS. 1 and 2.
Figure 4:
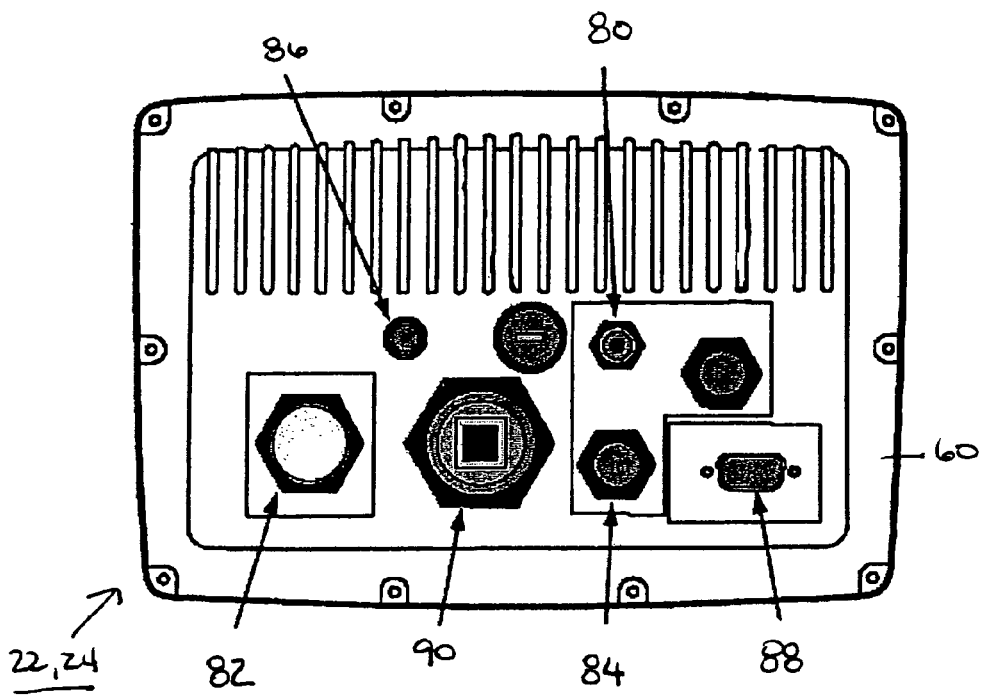
FIG. 4 is a reduced, rear view of the marine navigation device shown in FIG. 3.
Figure 5:
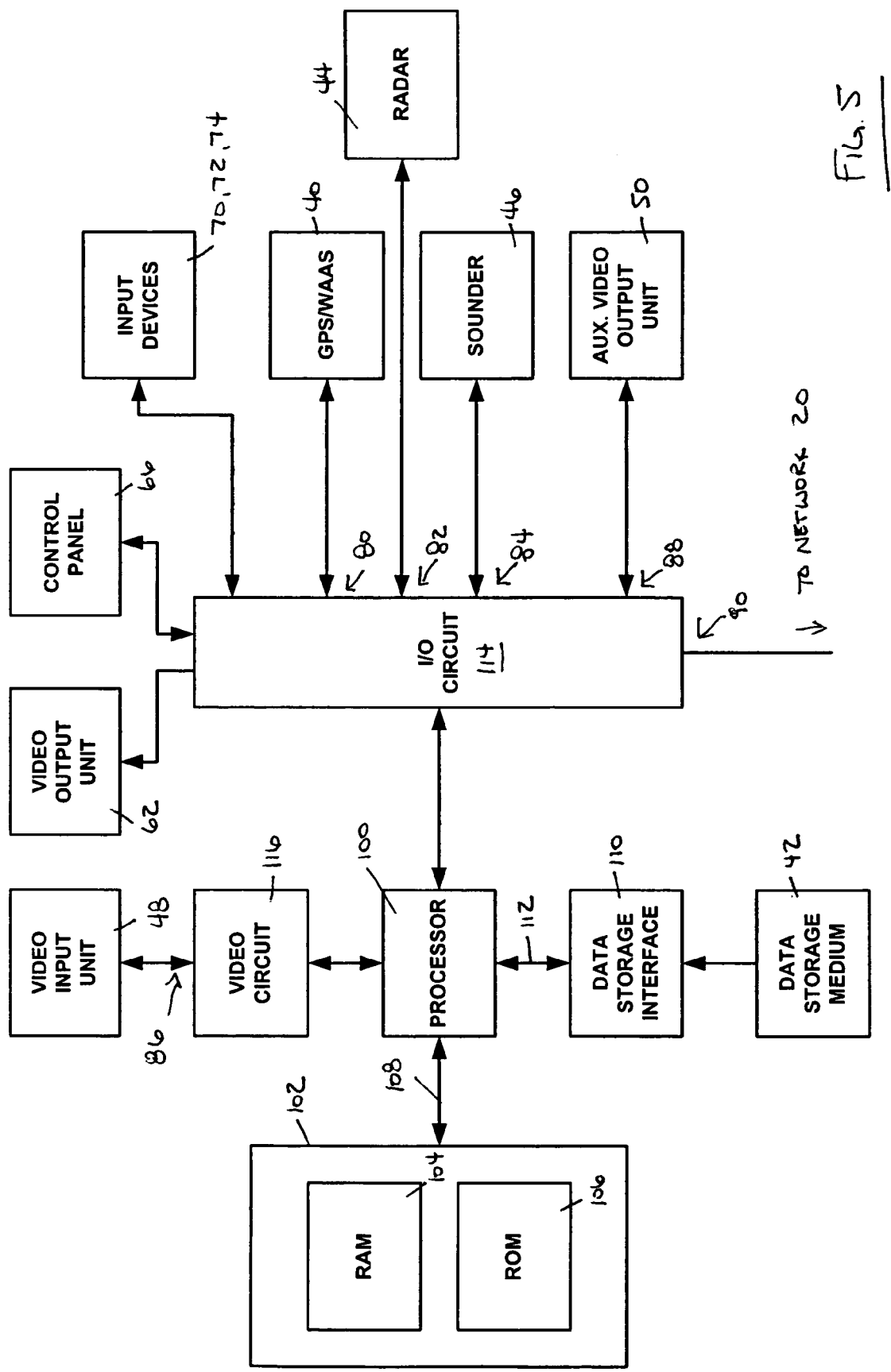
FIG. 5 is a block diagram of the marine navigation device shown in FIGS. 3 and 4.

The structure of the marine navigation devices 22, 24 is now discussed in greater detail with respect to FIGS. 3-5.

With reference first to FIG. 3, the marine navigation device 22, 24 includes a housing 60. Mounted in the housing 60 is a video output unit 62, for example an LCD. Along a first edge 64 of the video output unit 62 is a control panel 66, which according to this embodiment includes six push buttons ("menu keys") 68. In operation, textual and graphical information is displayed on the video output unit 62 in conjunction with the buttons 68 of the control panel 66. This permits the buttons 68 to be used for various functions, according to the textual and graphical information displayed on the video output unit 62. Other input devices may be disposed at other locations about the housing 60, such as the cursor pad 70, the keypad 72, and the labeled buttons ("named keys") 74. The functions of these buttons may be defined according to the textual and graphical information displayed on the video output unit 62, or may be determined according to the textual and/or graphical information displayed thereon irrespective of the textual and graphical information displayed on the video unit 62.

Referring next to FIG. 4, several connectors are shown in the rear of the housing 62, the connectors corresponding to a plurality of ports. For example, a port 80 may be provided to operatively couple the marine navigation device 22, 24 to the GPS antenna assembly 40. Additionally, a port 82 may be provided to operatively couple the device 22, 24 to an NMEA-compatible device, such as an autopilot, heading sensor, etc. or the radar 44, or, alternatively, a device such as a laptop computer via an RS-232 connection. Further, a port 84 may be provided to operatively couple the device 22, 24 to the sounder 46, or to memory devices for upload of data, such as navigational charts, waypoints, and the like. Ports 86, 88 may be provided for video in and out, such as may be provided by the video input unit 48 and to the video output unit 50, for example. Other devices 22, 24 may be operatively coupled to this device 22, 24 through a port 90.

FIG. 5 shows a block diagram of the electronics of the device 22, 24, as well as the connections to other of the devices illustrated in FIG. 1. The marine navigation device 22, 24 may include a processor 100 and memory 102, which may include both ROM (or program memory) 104 and RAM 106. The processor 100 may access the memory 102 via a bus 108. The processor 100 may also be coupled to a data storage interface unit 110, such as a disk drive, flash memory drive, etc., which may be used to access data stored on a compatible data storage medium 50. The coupling between the processor 100 and the data storage interface unit 110, may be via a data link 112 such as a bus.

Additionally, the processor 100 may be coupled to one or more input/output circuits 114. The I/O circuit 114 is coupled to the GPS antenna assembly 40, the radar assembly 44, the sounder assembly 46, the auxiliary video output unit 50, the video output unit 62, the control panel 68, and the other input devices 70, 72, 74. The coupling between the circuit 114 and the elements 40, 44, 46, 50, 62, 68, 70, 72, 74 may be separate, as is shown, or, alternatively, one or more of the elements 40, 44, 46, 50, 62, 68, 70, 72, 74 may be coupled to a common link or bus, which common link or bus may then be coupled to the circuit 114. Other input/output circuits may also be used; for example, a video circuit 116 is operatively coupled between the video input unit 48 and the processor 100 as shown in FIG. 5.

Having thus described the structure of the network 20 and the marine navigation devices 22, 24, the operation of the network 20 according to the present disclosure is now described.

Communication between the marine navigation devices 22, 24 may be administered through the use of unique identifiers for each of the devices 22, 24 included in the network 20. That is, each of the devices 22, 24 may be differentiated from the remaining devices 22, 24 of the network 20 according to the unique identifier associated with the device 22, 24, and communications between the devices 22, 24 may be facilitated through the use of these unique identifiers. According to the present disclosure, the unique identifiers may be defined by a unique serial number, but the disclosure is not limited thereby. Alternatively, the identifier may take other forms, such as an alpha-numeric form.

Figure 6:
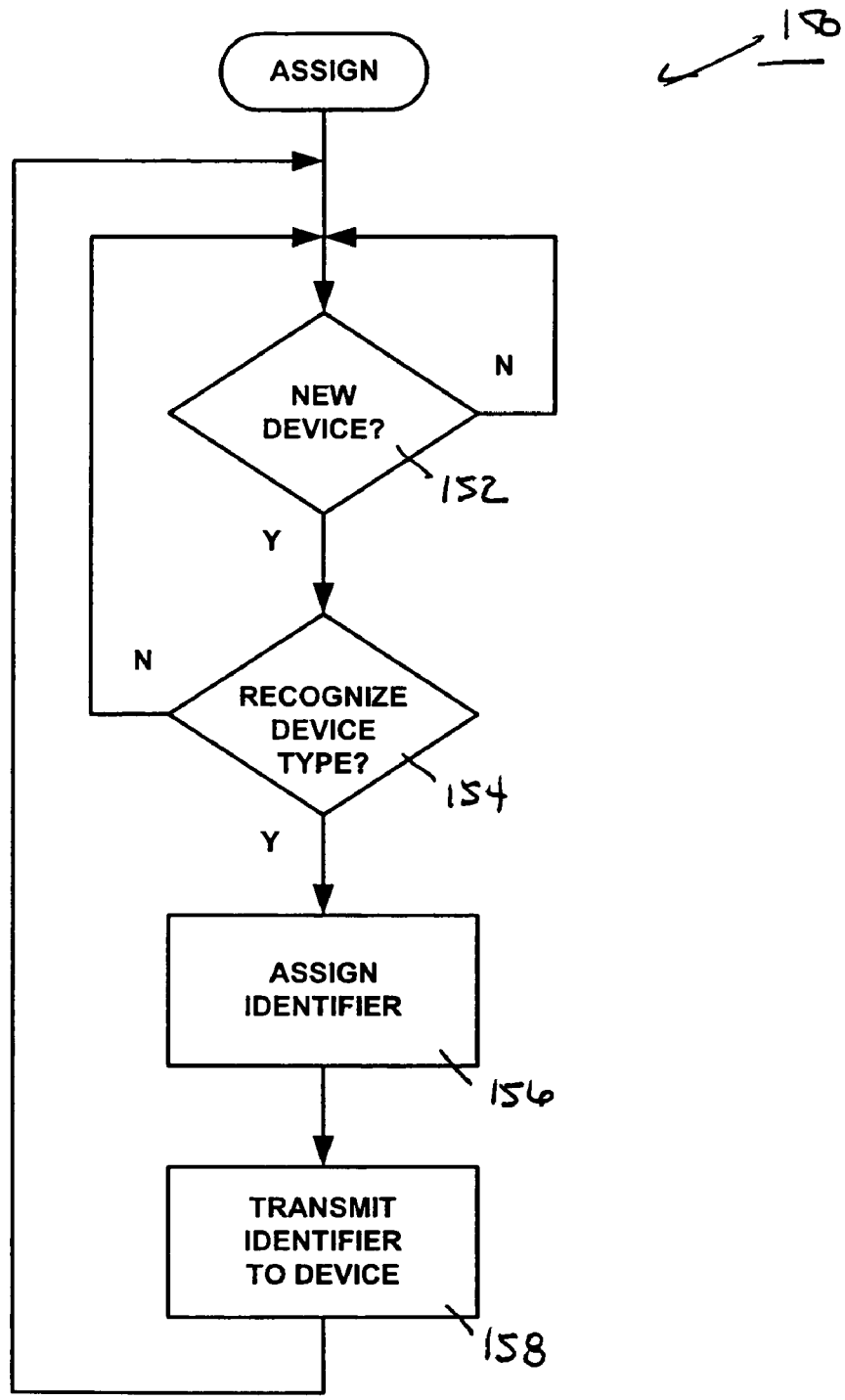
FIG. 6 is a flowchart of a networking method that may be performed during operation of the network shown in FIGS. 1 and 2.

The master device 22 assigns the identifiers to the slave devices 24 upon their activation. Specifically, a method 150 of assigning identifiers is illustrated in FIG. 6, and the processor 100 of the master device 22 may be programmed to carry out this method. At block 152, the master device 22 determines if any new devices 24 have been recently operatively coupled to the network 20. In this regard, a slave device 24 is considered "new" to the network 20 if the master device 22 has not previously determined that the slave device 24 is coupled to the network 20, and in particular, the master device 22. This is not to suggest that the slave device 24 might not have been coupled to the master device 22 at some time in the past. However, if the slave device 24 is decoupled from the network, which decoupling may take the form of a physical (the device 24 is separated from the remainder of the network 20) or an operational (the device 24 is not activated or powered up) decoupling from the network 20, then the slave device 24 is considered to be a "new" device when the physical or operational coupling is renewed. If no new devices 24 have been recently operatively coupled to the network 20, the method repeats the determination of block 152 until such time as it is determined that a new device 24 has been coupled to the network 20. Otherwise, the method proceeds to block 154.

At block 154, the master device 22 determines if the device 24 is a type of device that may be permitted to form part of the network 20. For example, the device 24 attempting to connect to the remainder of the network 20 may provide a message to the master device 22 upon the activation of the device 24, which message may include a header in which an identifier concerning the device type is contained (and which message may indicate that the device 24 has been recently operatively coupled to the network 20). The master device 22 may access this device type identifier, and examine the identifier to determine whether devices of this particular device type are permitted to connect to the remainder of the network 20. For example, the master device 22 may compare the device type identifier to one or more device type identifiers of devices which have been determined to acceptable to form part of a network 20 to see if there is a match.

In this regard, the master device 22 may store one or more lists in the memory 102, which lists include information or data concerning the devices that are permitted to form part of the network 20. For example, the lists may include identifiers (e.g., a number, textual information, a combination of a number and textual information, etc.) associated with manufacturers (e.g., Brunswick New Technologies-Marine Electronics of Acton, Mass.) that make devices that are permitted to form part of the network 20. Additionally or alternatively, the lists may include numbers associated with specific device types that are permitted to form part of the network 20, which devices types may be applicable to a group of devices manufactured by a specific manufacturer (e.g., 6000i marine navigation devices manufactured by Brunswick New Technologies-Marine Electronics of Acton, Mass.) without identifying the particular device attempting to communicate with the other devices that form the network 20. These lists may be updated periodically by uploading new information that may be disposed on a data storage media 42, for example.

If the master device 22 determines that the device 24 is a type of device that may be permitted to form part of the network 20, the method proceeds to block 156. Alternatively, if the master device 22 determines that the device 24 is a type of device that is not permitted to form part of the network 20, either because the identifier associated with the device 24 does not match any of the identifiers associated with devices which may be permitted to form part of the network 20 or because the identifier is missing altogether, then the method returns to block 152.

At block 156, the master device 22 assigns a unique identifier to the device 24. As stated above, this unique identifier may be a serial number, although the identifier may take other forms, such as alpha-numeric. According to an embodiment of the method according to this disclosure, the serial numbers used as unique identifiers are not reused. For example, the master device 22 may maintain a list of serial numbers, and when a serial number is assigned to a slave device 22 as an identifier, the serial number is removed from the list. According to other embodiments of the method according to this disclosure, the serial numbers may be reused.

At block 158, the master device 22 transmits the unique identifier to the new device 24. Additionally, the master device 22 may also transmit the unique identifier to the other devices 24 operatively coupled to the master device 22. For example, the master device 22 may format a message to the other devices 24 including the unique identifier, and transmit the message to the other devices 24. Once the master device 22 has transmitted the unique identifier to the slave devices 24, the method returns to block 152.

Once each of the slave devices 24 has received a unique identifier from the master device 22, the devices 22, 24 may communicate with each other through the use of the identifiers. That is, one device 22, 24 may prepare a message to be transmitted to another of the devices 22, 24, which message may have a header that includes the identifier of the sending device and the identifier of the intended recipient device. The other devices 22, 24 may use the recipient identifier information to determine whether the message is intended for them, and the sender's identifier to determine which device 22, 24 is the intended recipient of the reply.

What is claimed is:

1. A method for networking a plurality of marine navigation devices into a network, the network comprising one master marine navigation device and at least one slave marine navigation device, the method comprising:

determining if a slave marine navigation device has recently been operatively coupled to the one master marine navigation device;

determining if the slave marine navigation device is of a device type permitted to network with the one master marine navigation device;

assigning an identifier to the slave marine navigation device if the device is of a device type permitted to network with the one master marine navigation device; and transmitting the identifier to at least the slave marine navigation device.

2. The method according to claim 1, comprising:

receiving a message from the slave marine navigation device; and determining if the slave marine navigation device has recently been operative coupled to the master marine navigation device according to the receipt of the message.

3. The method according to claim 2, comprising:

receiving a message from the slave marine navigation device, the message comprising a device type identifier for the slave marine navigation device; and determining if the slave marine navigation device is of a device type permitted to network with the one master marine navigation device according the device type identifier.

4. The method according to claim 3, comprising:
receiving a message from the slave marine navigation device, the message comprising a device type identifier for the slave marine navigation device, the device type identifier including a manufacturer identifier and a device type number.

5. The method according to claim 3, comprising:
accessing a list of device type identifiers of devices permitted to network with the master marine navigation device;
comparing the device type identifier from the message received from the slave marine navigation device with the list of device type identifiers; and
determining if the slave marine navigation device is of a device type permitted to network with the one master marine navigation device according the comparison of the device type identifier from the message received from the slave marine navigation device with the list of device type identifiers.

6. The method according to claim 1, comprising:
determining if a second slave marine navigation device has recently been operatively coupled to the one master marine navigation device;
determining if the second slave marine navigation device is of a device type permitted to network with the one master marine navigation device;
assigning a second identifier to the second slave marine navigation device if the device is of a device type permitted to network with the one master marine navigation device; and
transmitting the second identifier to at least the second slave marine navigation device.

7. A network of marine navigation devices comprising:
at least one slave marine navigation device; and
one master marine navigation device, the master marine navigation device including a processor and a memory operatively coupled to the processor,
the processor programmed to determine if a slave marine navigation device has recently been operatively coupled to the one master marine navigation device;
the processor programmed to determine if the slave marine navigation device is of a device type permitted to network with the one master marine navigation device,
the processor programmed to assign an identifier to the slave marine navigation device if the device is of a device type-permitted to network with the one master marine navigation device, and
the processor programmed to transmit the identifier to at least the slave marine navigation device.

8. The network according to claim 7, wherein:
the processor is programmed to receive a message from the slave marine navigation device; and
the processor is programmed to determine if the slave marine navigation device has recently been operative coupled to the master marine navigation device according to the receipt of the message.

9. The network according to claim 8, wherein:
the processor is programmed to receive a message from the slave marine navigation device, the message comprising a device type identifier for the slave marine navigation device; and
the processor is programmed to determine if the slave marine navigation device is of a device type permitted to network with the one master marine navigation device according the device type identifier.

10. The network according to claim 9, wherein:
the processor is programmed to receive a message from the slave marine navigation device, the message comprising a device type identifier for the slave marine navigation device, the device type identifier including a manufacturer identifier and a device type number.

11. The network according to claim 9, wherein:
the processor is programmed to access a list of device type identifiers of devices permitted to network with the master marine navigation device;
the processor is programmed to compare the device type identifier from the message received from the slave marine navigation device with the list of device type identifiers; and
the processor is programmed to determine if the slave marine navigation device is of a device type permitted to network with the one master marine navigation device according the comparison of the device type identifier from the message received from the slave marine navigation device with the list of device type identifiers.

12. The network according to claim 7, wherein:
the processor is programmed to determine if a second slave marine navigation device has recently been operatively coupled to the one master marine navigation device;
the processor is programmed to determine if the second slave marine navigation device is of a device type permitted to network with the one master marine navigation device;
the processor is programmed to assign a second identifier to the second slave marine navigation device if the device is of a device type permitted to network with the one master marine navigation device; and
the processor is programmed to transmit the second identifier to at least the second slave marine navigation device.

* * * * *

UNITED STATES PATENT AND TRADEMARK OFFICE
CERTIFICATE OF CORRECTION

PATENT NO. : 7,430,461 B1
APPLICATION NO. : 10/967962
DATED : September 30, 2008
INVENTOR(S) : Damon C. Michaels It is certified that error appears in the above-identified patent and that said Letters Patent is hereby corrected as shown below:

Title page,
Item (73) Assignee, "St. Helier, NJ (US)" should read --St. Helier, Jersey, Channel Islands--.

Column 6,
Line 57, "operative" should read --operatively--;
Line 66, after "according" insert --to--.

Column 7,
Line 15, after "according" insert --to--.

Column 8,
Line 2, "operative" should read --operatively--;
Line 31, after "according" insert --to--.

Signed and Sealed this

Ninth Day of March, 2010

David J. Kappos
*Director of the United States Patent and Trademark Office*